(12) United States Patent  (10) Patent No.: US 8,250,206 B2
Horii et al.  (45) Date of Patent: Aug. 21, 2012

(54) COMMUNICATION CONTROL

(75) Inventors: Hiroshi Horii, Yamato (JP); Toshihiro Takahashi, Yamato (JP)

(73) Assignee: International Business Machines Corporation, Armonk, NY (US)

( * ) Notice: Subject to any disclaimer, the term of this patent is extended or adjusted under 35 U.S.C. 154(b) by 237 days.

(21) Appl. No.: 12/358,275

(22) Filed: Jan. 23, 2009

(65) Prior Publication Data

US 2009/0193077 A1 Jul. 30, 2009

(30) Foreign Application Priority Data

Jan. 25, 2008 (JP) .................................. 2008-15446

(51) Int. Cl.
*A63F 9/24* (2006.01)

(52) U.S. Cl. ............................... 709/224; 463/4; 463/23

(58) Field of Classification Search .................. 709/224; 463/4, 23
See application file for complete search history.

(56) References Cited

U.S. PATENT DOCUMENTS

| 6,701,363 | B1 * | 3/2004 | Chiu et al. | 709/224 |
| 7,244,181 | B2 * | 7/2007 | Wang et al. | 463/42 |
| 7,682,243 | B2 * | 3/2010 | Kim | 463/23 |
| 2008/0004107 | A1 * | 1/2008 | Nguyen et al. | 463/29 |
| 2008/0176655 | A1 * | 7/2008 | James et al. | 463/42 |

FOREIGN PATENT DOCUMENTS

JP 2007-050154 3/2007

* cited by examiner

*Primary Examiner* — David Lazaro
*Assistant Examiner* — Marie Georges Henry
(74) *Attorney, Agent, or Firm* — Cantor Colburn LLP; Vazken Alexanian

(57) ABSTRACT

A server including a storage unit for storing a history of activities that each character in a virtual world has performed; a search unit for searching the storage unit to retrieve a history of activities in which a first character that performs an activity on a first client has changed the states of a second client that performs an activity on a second client; a calculation unit for calculating, on the basis of the retrieved history, a score indicating the extent to which the first character has changed the state of the second character; and a transmission control unit for controlling the frequency with which the states of the first character are changed according to an operation performed by a user on the first client.

17 Claims, 9 Drawing Sheets

| AVATAR ID | STATES | | | |
|---|---|---|---|---|
| | POSITION | ORIENTATION | AFFILIATION | OBJECTS IN SIGHT |
| ⋮ | ⋮ | ⋮ | ⋮ | ⋮ |
| 1011 | (112, 225) | (135, 221) | 12 | 1012, 1023,⋯ |
| 1012 | (116, 222) | (215, 145) | 12 | 1011, 1024,⋯ |
| 1013 | (156, 201) | (201, 133) | 13 | 1011, 1012,⋯ |
| 1014 | (232, 156) | (202, 140) | 12 | 1055, 1056,⋯ |
| ⋮ | ⋮ | ⋮ | ⋮ | ⋮ |

14, 24

COORDINATE SYSTEM OF VIRTUAL WORLD

| ACTIVITY ID | AVATAR ID | ACTIVITY TYPE | DESCRIPTION |
|---|---|---|---|
| ⋮ | ⋮ | ⋮ | ⋮ |
| 12212 | 1011 | 30-1012 | 1012 CAME INTO SIGHT |
| 12213 | 1011 | 31-1012 | RECEIVED MESSAGE FROM 1012 |
| 12214 | 1011 | 32-1012 | HEARD 1012'S SOUND |
| ⋮ | ⋮ | ⋮ | ⋮ |
| 13452 | 1012 | 20-1011 | CAME INTO 1011'S SIGHT |
| 13453 | 1012 | 21-1011 | TRANSMITTED MESSAGE TO 1011 |
| 13454 | 1012 | 22-1012 | 1011 HEARD 1012'S SOUND |
| ⋮ | ⋮ | ⋮ | ⋮ |

|   | A | B  | C | D | E  | F |
|---|---|----|---|---|----|---|
| A |   | 10 | 1 | 2 | 10 | 0 |
| B | 8 |    | 5 | 5 | 5  | 0 |
| C | 4 | 8  |   | 2 | 2  | 0 |
| D | 3 | 8  | 0 |   | 0  | 0 |
| E | 2 | 0  | 5 | 0 |    | 0 |
| F | 8 | 8  | 8 | 8 | 8  |   |

FIG. 10

|   | A     | B     | C     | D    | E    | F |
|---|-------|-------|-------|------|------|---|
| A |       | 0.18  | 1.8   | 0.9  | 0.18 |   |
| B | 0.225 |       | 0.36  | 0.36 | 0.36 |   |
| C | 0.45  | 0.225 |       | 0.9  | 0.9  |   |
| D | 0.6   | 0.225 |       |      |      |   |
| E | 0.9   |       | 0.36  |      |      |   |
| F | 8     | 0.225 | 0.225 | 0.225| 0.225|   |

FIG. 11

|   | A     | B     | C     | D    | E    | F  |
|---|-------|-------|-------|------|------|----|
| A |       | 0.2   | 1.8   | 0.9  | 0.2  | 10 |
| B | 0.225 |       | 0.36  | 0.36 | 0.36 | 10 |
| C | 0.45  | 0.225 |       | 0.9  | 0.9  | 10 |
| D | 0.6   | 0.225 | 10    |      | 10   | 10 |
| E | 0.9   | 10    | 0.36  | 10   |      | 10 |
| F | 8     | 0.225 | 0.225 | 0.225| 0.225|    |

FIG. 12

| A     | B    | C   | D     | E    | F |
|-------|------|-----|-------|------|---|
| 0.225 | 0.18 | 1.8 | 0.225 | 0.18 |   |

FIG. 13

| A     | B   | C   | D     | E   | F  |
|-------|-----|-----|-------|-----|----|
| 0.225 | 0.2 | 1.8 | 0.225 | 0.2 | 10 |

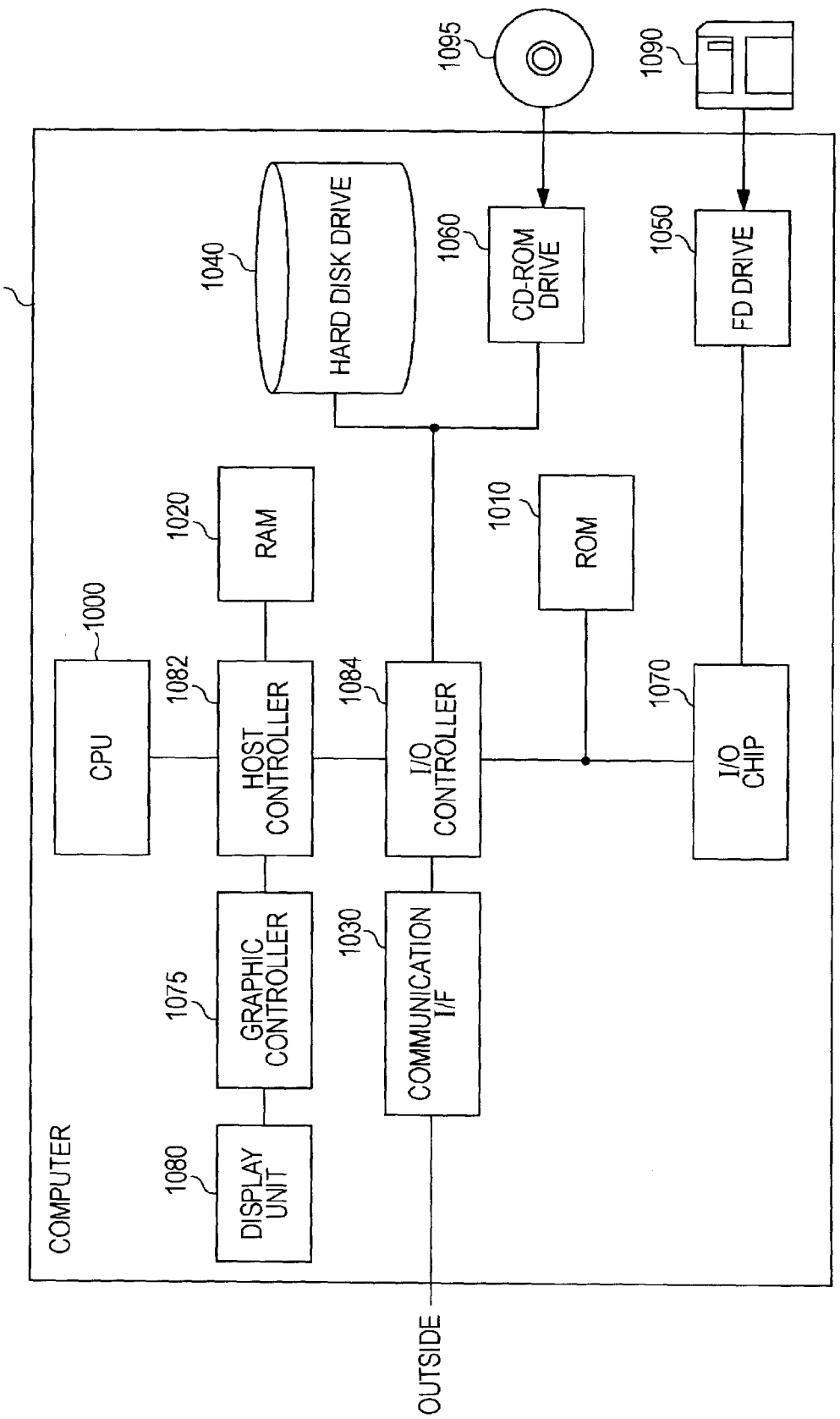

COMMUNICATION CONTROL

CROSS REFERENCE TO RELATED APPLICATION

This application claims priority under 35 U.S.C. 119 from Japanese Application No. 2008-15446 filed Jan. 25, 2008, the entire contents of which are incorporated herein by reference.

BACKGROUND OF THE INVENTION

1. Field of the Invention

The present invention relates to controlling communications. In particular, the invention relates to a system, method, and program for controlling the communication frequency.

2. Description of Related Art

In recent years, virtual worlds have been developed not only for personal pleasure purposes such as games but also for business purposes and have been used by a number of users. In practice, a virtual world is created by clients that are operated by users and a server for collecting and managing various types of information. If a user operates a client, an influence that the operation has had on the virtual world is transmitted as data to the server. On the other hand, if the server transmits data to a client, the transmitted data is related to only the user of the client. According to this mechanism, an image is displayed on the screen of the client in such a manner that the image is updated in real time, as if to show the sight of a character serving as an avatar of the user.

For further background on technology for controlling a virtual world, see Japanese Unexamined Patent Application Publication No. 2007-50154.

However, if a great number of clients communicate with a small number of servers simultaneously, an enormous amount of data may need to be communicated. This may cause a delay in data update, which may impair the real-time nature of the virtual world. For example, even if a second character staying within sight of a first character is moved, information on the movement is not immediately transmitted from a second client to a first client for operating the first character. As a result, there occurs a delay before the second character is moved in an image indicative of the sight of the first character.

SUMMARY OF THE INVENTION

An object of the present invention is to provide a system, a method, and a program for solving the above-described problem. In accordance with the present invention, a server is provided which includes a storage unit for storing a history of activities, the activities having been performed by characters in a virtual world according to operations performed on corresponding clients; a search unit for searching the storage unit to retrieve a history of activities in which a first character has changed a state of a second character, the first character being configured to perform an activity according to an operation performed on a first client, the second character being configured to perform an activity according to an operation performed on a second client; a calculation unit for calculating a score (an index) indicating the extent to which the first character has changed the state of the second character, on the basis of the retrieved history; and a transmission control unit for controlling the frequency with which a state of the first character is transmitted to the second client, on the basis of the calculated score (index), the state of the first character having been changed according to an operation performed by a user on the first client. Also, there are provided a method and a program product for causing a computer to serve as the above-described server.

The above-described outlines of the present invention do not list all features essential to the present invention and subcombinations of the features can also fall within the invention.

BRIEF DESCRIPTION OF THE DRAWINGS

In the following, embodiments of the invention will be described referring to the accompanying drawings. In the drawings, same reference numerals refer to same or corresponding elements.

FIG. 10 shows a specific example of downlink synchronization cycles calculated by a transmission control unit according to this embodiment.

FIG. 11 shows an example of downlink synchronization cycles modified by the transmission control unit according to this embodiment.

FIG. 12 shows a specific example of uplink synchronization cycles set by a reception control unit according to this embodiment.

FIG. 13 shows an example of uplink synchronization cycles modified by the reception control unit according to this embodiment.

FIG. 14 shows an example of a hardware configuration of a computer serving as a server according to this embodiment.

DETAILED DESCRIPTION OF PREFERRED EMBODIMENTS

Figure 1:
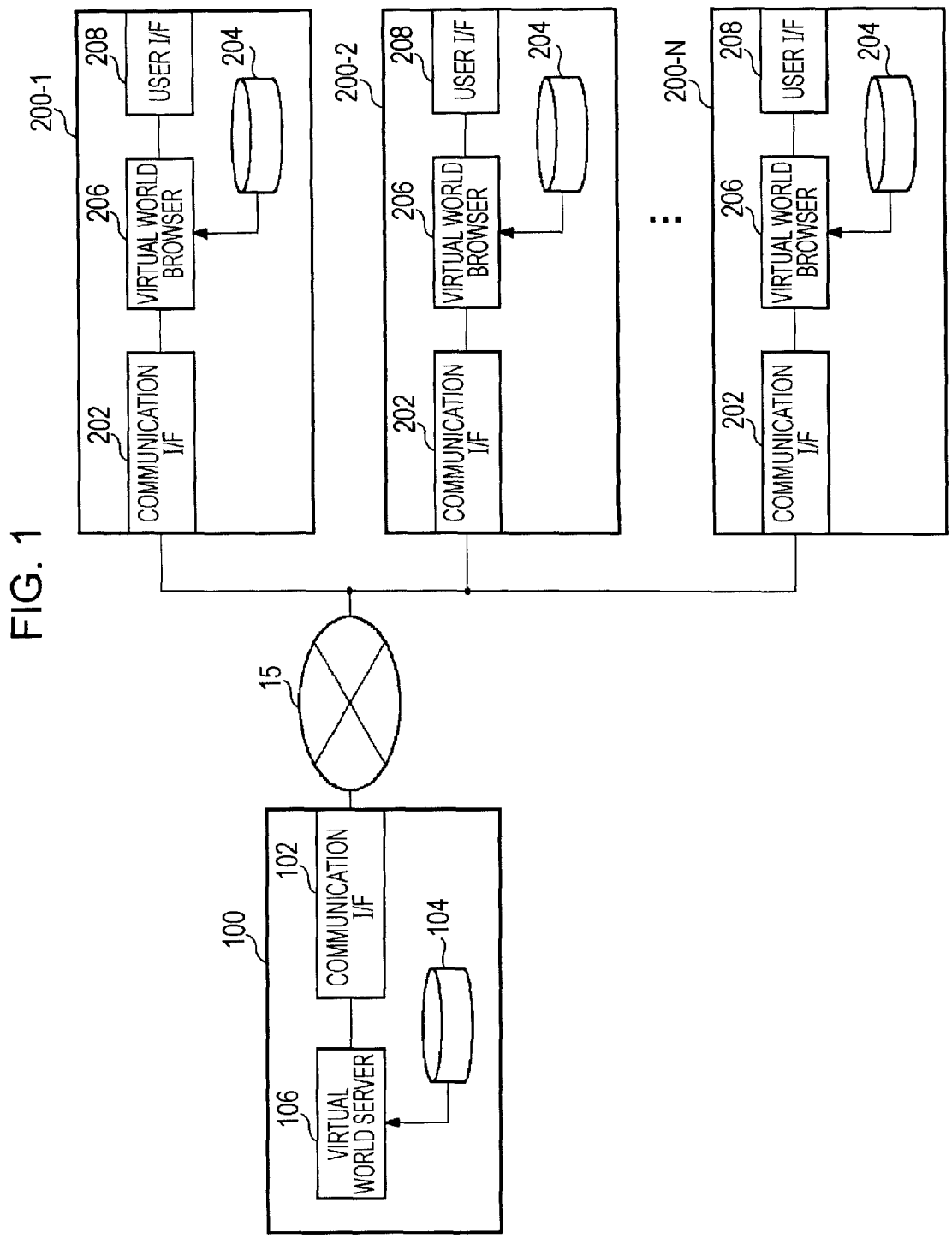
FIG. 1 shows an overall configuration of an information system according to an embodiment of the present invention.

Referring to FIG. 1, there is shown an overall configuration of an information system according to this embodiment. The information system includes a server 100 and multiple clients, 200-1 to 200-N. The server 100 is coupled to the clients 200-1 to 200-N via a communication network 15 such as the Internet.

The server 100 includes a communication interface 102 such as a network interface card (NIC) and a storage unit 104 such as a hard disk drive. The server 100 reads a program from the storage unit 104 and performs the program using a central processing unit (CPU), thereby serving as a virtual world server 106.

The virtual world server 106 manages a virtual world in which multiple characters perform activities. Specifically, the server 100 manages data such as data on the respective positions, orientations, and/or appearances of the characters in the virtual world.

Each of the clients 200-1 to 200-N includes a communication interface 202 such as an NIC and a storage unit 204 such as a hard disk drive. Each client reads a program from the storage unit 204 and performs the program using a CPU, thereby serving as a virtual world browser 206.

The clients 200-1 to 200-N are provided to operate different characters. For example, a user operates his or her avatar in the virtual world by operating the client 200-1 serving as the virtual world browser 206. Another user operates his or her avatar in the virtual world by operating the client 200-2 serving as the virtual world browser 206.

While the characters here are, for example, avatars of users as described above, the characters are not limited thereto as long as they are operated by users using the clients 200-1 to 200-N. For example, the characters may be entities that perform activities in a game world such as a massively multi-player online role-playing game (MMORPG).

Assuming that the characters are avatars, this embodiment will be described below.

The mechanism for operating the avatars is as follows. Upon receipt of an operation from its user, the client 200-1 serving as the virtual world browser 206 changes data indicating the state of the user's avatar such as the position, orientation, and/or appearance of the avatar and stores the resultant data in the storage unit 204.

For example, the data stored in the storage unit 204 is periodically collected by the server 100 serving as the virtual world server 106 so that the collected data is stored in the storage unit 104. The same is true for the clients 200-2 to 200-N except that the users and avatars thereof are different from the user and avatar of the client 200-1.

On the other hand, the data stored in the storage unit 104 is transmitted to each of the clients 200-1 to 200-N so that the transmitted data is stored in the storage units 204. As a result, the states of the avatars of the users of the clients 200-2 to 200-N as well as the states of the avatar of the user of the client 200-1 are stored in the storage unit 204 of the client 200-1.

In this way, the virtual world server 106 synchronizes the states of the avatars stored in the respective storage units 204 of the clients 200-1 to 200-N. Thus, the users of the clients 200-1 to 200-N can grasp changes in states of the avatars of other users in real time and operate their avatars while feeling as if they themselves are experiencing the virtual world.

However, if too many clients 200 are coupled to the server 100, the total amount of data to be synchronized becomes too large. This may causes a delay in data communications. That is, a delay in data communications may cause a delay in data synchronization, which may impair the real-time nature of the virtual world. In order to prevent such a communication delay, this embodiment performs proper communication are updated with a high frequency and other data are updated with a lower frequency. This communication control will be described in detail below.

Figure 2:
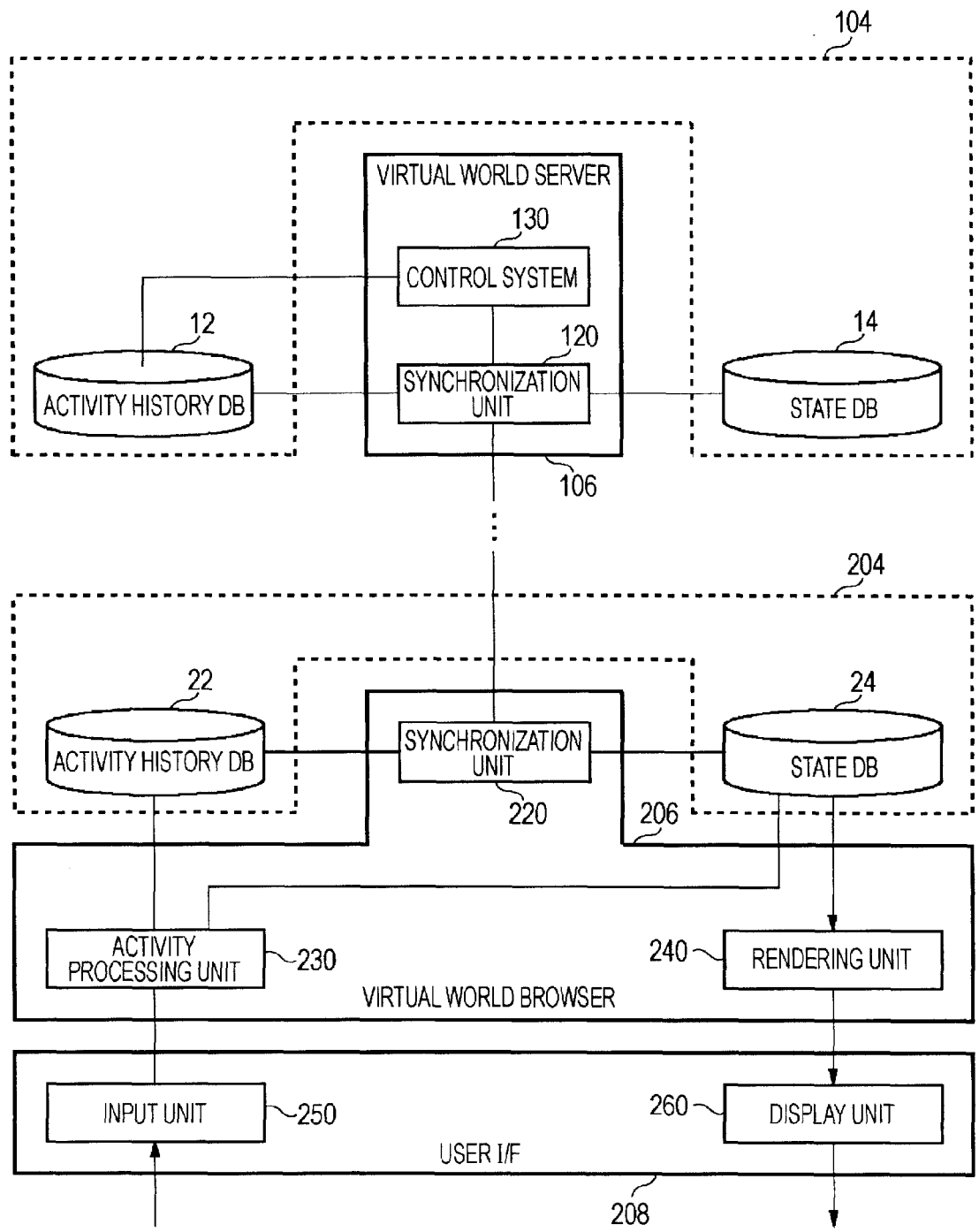
FIG. 2 shows functional configurations of a virtual world server and a virtual world browseraccording to this embodiment together with configurations of two storage units that may be used in the embodiment of the invention.

FIG. 2 shows functional configurations of the virtual world server 106 and virtual world browsers 206 according to this embodiment along with the storage unit 104 and storage units 204. The storage unit 104 includes an activity history data base (DB) 12 and a state DB 14. The activity history DB 12 stores the histories of activities of avatars in the virtual world. The state DB 14 stores the states of the avatars in the virtual world. The virtual world server 106 includes a synchronization unit 120 and a control system 130. It accesses the activity history DB 12 and state DB 14 to perform synchronization.

The storage unit 204 of the client 200-1 includes an activity history DB 22 and a state DB 24. The activity history DB 22 stores the history of activities of the avatar of the user of the client 200-1. The state DB 24 stores the states of the avatar of the user of the client 200-1 and other avatars related to the user's avatar among the avatars in the virtual world. The "other avatars related to the user's avatar" here refer to avatars staying within the sight of the user's avatar or avatars present in the proximity of the user's avatar, or the like. That is, the state DB 24 caches a part of the data stored in the state DB 14.

Virtual world browser 206 includes a synchronization unit 220, an activity processing unit 230, and a rendering unit 240 and accesses the activity history DB 22 and state DB 24 to perform synchronization. Specifically, first the synchronization unit 120 of the virtual world server 106 reads the states of the avatars from the state DB 14, for example, periodically and transmits the read states to the synchronization unit 220 of the virtual world browser 206. The synchronization unit 220 stores the received states in the state DB 24. As a result, not only the state of the avatar operated by the client 200-1 but also the states of the avatars operated by the clients 200-2 to 200-N are stored in the state DB 24.

The states of an avatar include, for example, data on the position, orientation, appearance, and/or the like of the avatar in the virtual world. According to these pieces of information, the rendering unit 240 renders an image indicating the sight of the avatar operated by the client 200-1. For example, according to information on the position and orientation of each avatar in the virtual world, the rendering unit 240 determines whether any other avatars are present in the direction in which the avatar is oriented.

If any other avatars are present in the direction in which the avatar is oriented, the rendering unit 240 renders an image showing the appearances of such other avatars, according to the information on the appearances of such other avatars.

An input unit 250 receives an operation performed by the user. Once the input unit 250 has received such an operation, the activity processing unit 230 updates the states of the avatar of the user. For example, if the input unit 250 receives an operation for moving the avatar from the user, the activity processing unit 230 updates the information on the position and orientation of the avatar stored in the state DB 24.

In addition to such a movement, various types of activities are performed by an avatar. Among these activities is an interaction made between an avatar and another avatar. For example, such an interaction may be the transmission of a message from an avatar to another avatar. The transmitted message is displayed on the message window of a display unit 260 of the client 200 for operating another avatar that has received the message. The history of various activities including such message transmission is stored in the activity history DB 22.

Each synchronization unit 220 transmits the states and activity history of the avatar updated or stored in these ways to the synchronization unit 120, for example, periodically or in response to a request from the synchronization unit 120. Then, the synchronization unit 120 stores the received states in the state DB 14 and the received activity history in the activity history DB 12. Thus, the states of all the avatars present in the virtual world are collected into the state DB 14 and the histories of the activities of these avatars are collected into the activity history DB 12.

If an excessive number of clients 200 are coupled to the server 100 simultaneously, too high a processing load may be imposed on the server 200 or too high a load may be imposed on the communication network 15. This may reduce the frequency with which the states of the avatars are synchronized.

A control system performs communication control so that data synchronization is properly performed in such an environment. This control will be described below with reference to FIG. 5.

Figures 3A, 3B:
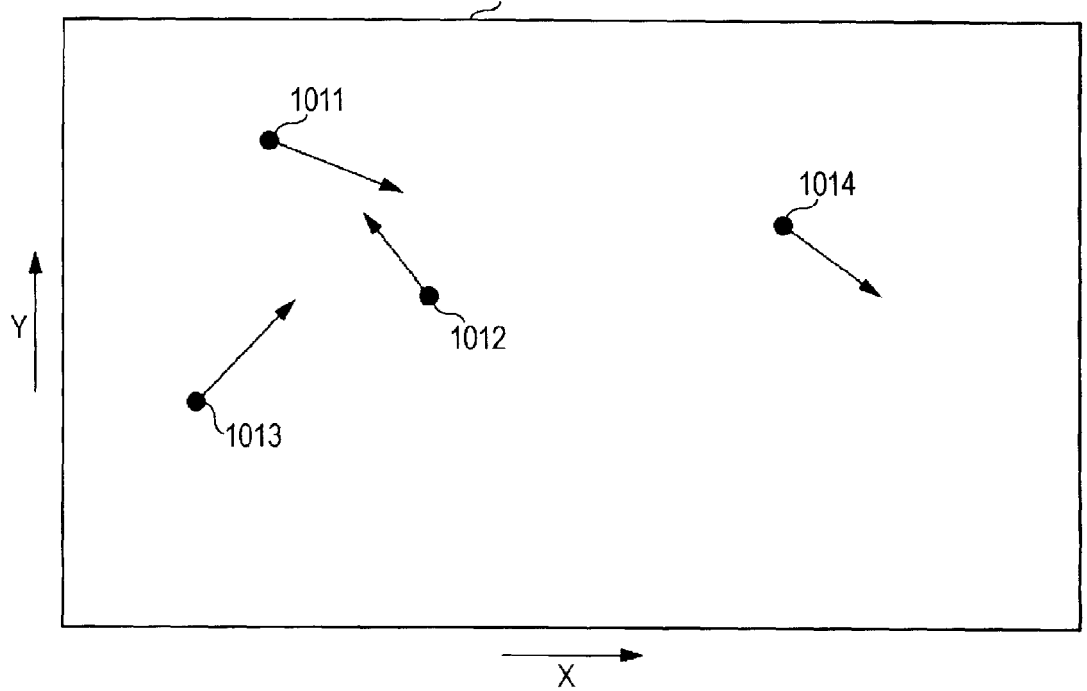
FIG. 3a shows one example of a data structure of two states according to this embodiment.
FIG. 3b shows a conceptual diagram of a virtual world shown by one of the states according to this embodiment.

Referring to FIG. 3a, there is shown one example of data structures of the state DB 14 and state DB 24 according to this embodiment. The state DB 14 stores the states of the avatars in a manner that the corresponding states are associated with each avatar. There are various types of states. As examples of such states, FIG. 3a shows the position, orientation, and affiliation of each avatar, and objects staying within sight of each avatar. As seen in the diagram, the states include not only items specific to each avatar, such as the position or name of the avatar, but also items that each user can recognize via a user interface 208 (shown in FIG. 2) such as the display unit 260, such as objects staying within sight of the avatar.

For example, the position of an avatar 1011 is a position (112, 225) in a coordinate system of the virtual world and the orientation thereof is a direction represented by a vector (135, 221) in the coordinate system. The affiliation of the avatar 1011 is 12. The IDs of avatars staying within sight of the avatar 1011 are 1012, 1023, and the like. A conceptual diagram of the virtual world including the positions and orientations of these avatars is shown in FIG. 3b.

FIG. 3b is a conceptual diagram of a virtual world represented by data stored in the state DB 14 according to this embodiment. In FIG. 3b, each avatar is represented by a node and the orientation of each node is represented by an arrow connected to the node. An avatar 1012 stays within sight of the avatar 1011 and the avatar 1011 stays within sight of the avatar 1012, that is, the avatars 1011 and 1012 face each other. Also, the avatars 1011 and 1012 stay within sight of an avatar 1013, that is, the avatar 1013 is oriented to the avatars 1011 and 1012.

As seen in the diagram, the virtual world may be a world including the positions and orientations of avatars, like the real world. Or the virtual world may be a world including no concepts such as the positions and orientations of avatars, like a world in which communications are established via only character media such as chats or electronic mails. Or the virtual world may be a world in which avatars are present in a coordinate system more similar to the real world, such as a three-dimensional coordinate system.

The state DB 24 has a data structure almost identical to that of the state DB 14 shown in FIG. 3a except that it includes only a part of the records stored in the state 14, and will not be described.

Figures 4, 5:
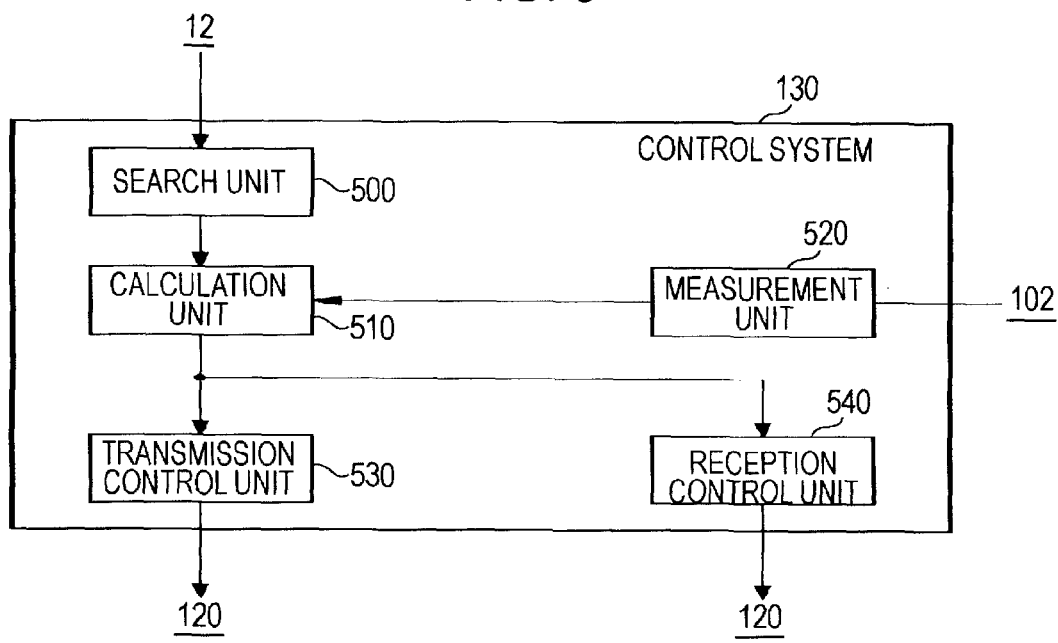
FIG. 4 shows one example of a data structure of two activity histories that may be used in this embodiment.
FIG. 5 shows one example of a functional configuration of a control system according to this embodiment.

Referring to FIG. 4, there is shown one example of a data structure of the activity history DB 12 and activity history DB 22 according to this embodiment. The activity history DB 12 stores activities in a manner that, for each activity, the activity identification (ID) of the activity, the ID of an avatar that has performed the activity, the ID of the type of the activity, and the description of the activity are associated with one another. Note that the description of each activity is shown to clarify the activity and is not always essential as a content of the activity history DB 12.

The activity ID refers to, for example, a serial number assigned to each of activities performed in the virtual world. For example, if the avatar 1011 performs an activity three times, the performed activities are assigned different IDs such as 12212, 12213, and 12214. The activity 12212 shows that the avatar 1012 has come into sight of the avatar 1011. The type of the activity 12212 is identified, for example, using a numerical value 30-1012.

On the other hand, the activity 12213 shows that the avatar 1011 has received a message from the avatar 1012. The type of the activity 12213 is identified, for example, using a numerical value 31-1012. The activity 12214 shows that the avatar 1011 has heard a sound of the avatar 1012. The type of the activity 12214 is identified, for example, using a numerical value 32-1012.

Also, an activity 13452 shows that the avatar 1012 has come into sight of the avatar 1011. The type of the activity 13452 is identified, for example, using a numerical value 20-1011. This activity is symmetrical to the above-described activity 30-1012. As seen in the diagram, all the symmetrical multiple activities may be stored in the activity history DB 12.

Those skilled in the art will recognize that the occurrence of an activity and storing/managing the detected activity can be accomplished in various ways. One such way is as follows. First, the activity processing unit 230 of the client 200-1 detects that the position or orientation of an avatar (hereafter referred to as "user avatar" in the sense that the avatar is operated by the user of the client 200-1) has changed, according to an operation of the user received by the input unit 250. Then, the activity processing unit 230 determines the sight of the avatar on the basis of the changed position or orientation.

Next, the activity processing unit 230 selects the IDs of avatars staying within the determined sight on the basis of the position of each avatar stored in the state DB 24. The selected IDs are stored in the state DB 24 such that the IDs are associated with the user avatar. The activity processing unit 230 stores the history of activities indicating that these avatars have come into sight of the user avatar, in the activity history DB 22.

More specifically, the activity processing unit 230 keeps, in the activity history DB 22, a record indicating the activity and having a new activity ID. In the record, the activity processing unit 230 sets the ID 1101 of the user avatar as the ID of the avatar that has performed the activity. Also, in the record, the activity processing unit 230 sets an ID indicating the activity type. For example, the activity type ID is created by combining a prefix 30 indicating that another avatar has come into sight of the user avatar and a suffix 1012 indicating such another avatar.

The above-described process is repeated in each of the clients 200-1 to 200-N and then the activity history DB 22 of each client 200 and the activity history DB 12 are synchronized. Thus, the histories of the activities in the virtual world are collected into the activity history DB 12.

A process of controlling communications on the basis of the histories of the activities collected in this way will now be described with reference to FIG. 5.

FIG. 5 shows one example of a functional configuration of the control system 130 according to this embodiment. The control system 130 includes a search unit 500, a calculation unit 510, a measurement unit 520, a transmission unit 530, and a reception unit 540. The control system 130 controls the frequency with which changes in state of each of the multiple avatars in the virtual world are transmitted to each of the clients via the communication network 15.

As a representative part of such control, control of the frequency with which the states of a first avatar, which performs an activity according to an operation performed on a first client (for example, client 200-1), are transmitted to a second client (for example, client 200-2) for operating a second avatar will be described. First, the search unit 500 searches the activity history DB 12 for the history of activities in which the first avatar has changed the states of the second avatar.

The "activity" here refers to, for example, a display of a display object indicating the first avatar on a screen of the second client 200-2 indicating the sight of the second avatar, as seen in the above-described example. Or the activity may be an arrival of a message transmitted from the first avatar at the second avatar. Or the activity may be a hearing of by the second avatar of a sound emitted by the first avatar in the virtual world.

In the case of a virtual world for a game, the activity may be that the first avatar is within the range of a gun that the second avatar possesses in the virtual world. Or the activity may be that the first and second avatars each possess an object of the same type that an object sold by the first avatar is purchased by the second avatar.

Next, the calculation unit 510 calculates a score indicating the extent to which the first avatar has changed the states of the second avatar, on the basis of the retrieved history of activities. Or, since a weight indicating the extent to which the states are changed is associated with each activity type, the calculation unit 510 may sum up such weights of the retrieved activities so as to calculate a score.

The measurement unit 520 measures the total amount of communications performed between the server 100 and clients 200-1 to 200-N during a past predetermined period, for example, on the basis of the communication state of the communication interface 102. Then, the transmission control unit 530 controls the frequency with which the states of the first avatar are transmitted to the client 200-2, on the basis of the measured total amount of communications and the calculated score.

For example, a higher score indicates that the second avatar has been significantly influenced by the first avatar. In this case, there is a high possibility that the user operating the second avatar wants to know changes in states of the first avatar in detail upon occurrence of such changes.

For this reason, the transmission control unit 530 increases the frequency with which the states of the first avatar are transmitted from the server 100 to the client 200-2, in proportion to the magnitude of the calculated score. If the above-described total amount of communications is larger than a predetermined target amount of communications, too high a load may unfavorably be imposed on the communication network 15 or server 100.

In such a case, the transmission control unit 530 reduces the frequency with which the states of the first avatar are transmitted from the server 100 to the client 200-2 even if the above-described score is the same. Thus, the load imposed on the communication network 15 and server 100 is maintained at a proper level.

The control system 130 performs the above-described communication control with respect to all combinations of the avatars in the virtual world. Subsequently, the search unit 500, calculation unit 510, and reception control unit 540 control the frequency with which the server 100 receives the states of the avatars from the clients 200-1 to 200-N, according to the steps below.

With respect to each of the avatars in the virtual world, the search unit 500 searches for the history of activities in which the states of the avatar have been changed by any other avatars. Subsequently, with respect to each of the avatars in the virtual world, the calculation unit 510 calculates a score indicating the extent to which the states of the avatar have been changed by each of such other avatars, on the basis of the histories retrieved with respect to the avatar.

Then, with respect to each avatar, the reception control unit 540 selects the largest one of the scores indicating the extent to which the states of the avatar have been changed by each of other avatars. The reception control unit 540 controls the frequency with which the server 100 obtains the states of the avatar, on the basis of the selected largest score.

For example, assume that the extent to which the states of the first avatar have been changed by the second avatar is represented by a numerical value "105." Also, assume that the extent to which the state of the first avatar has been changed by the third avatar is represented by a numerical value "120." The larger of these values, "120," is selected.

Then, the reception control unit 540 controls the frequency with which the server 100 obtains the states of the first avatar from the client 200-1, on the basis of the selected largest value.

As is understood from the above-description, with respect to each avatar, the largest one of the frequencies with which the states of the avatar are transmitted from the server 100 to each of the clients 200-1 to 200-N is set for the frequency with which server 100 receives the states of the avatar from the client 200 for operating the avatar.

Figure 6:
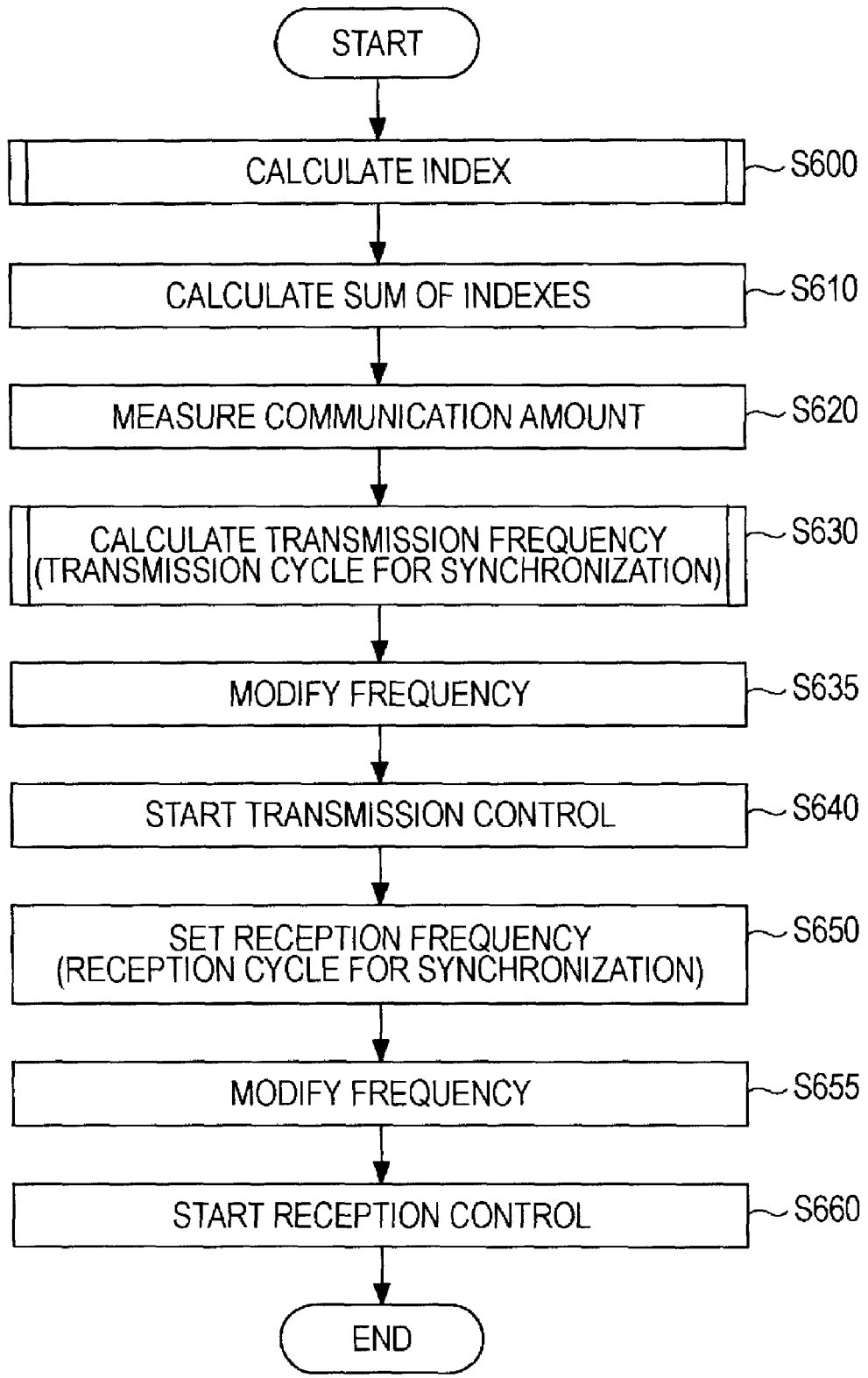
FIG. 6 shows a flow of a process in which the control system according to this embodiment controls communications on the basis of an activity history.

Referring to FIG. 6, there is shown a flow of a process in which the control system 130 according to this embodiment controls communications on the basis of an activity history. The control system 130 performs the following process each time a predetermined time $t_s$ has elapsed. First, the search unit 500, calculation unit 510, and measurement unit 520 collaboratively perform a process of calculating a score (step S600).

Figure 7:
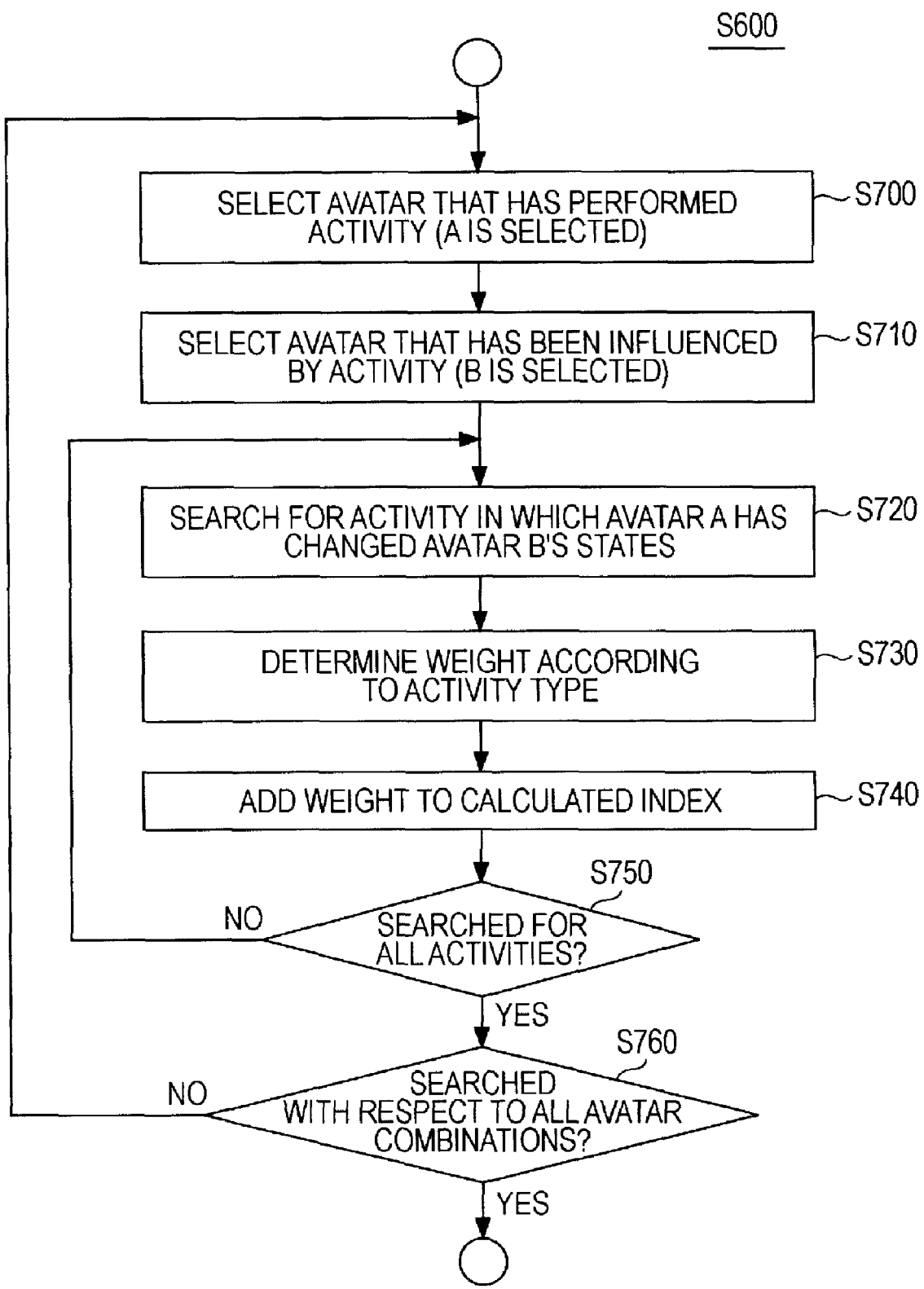
FIG. 7 shows details of process step S600 of FIG. 6.

Referring to FIG. 7, details of the process in step S600 of FIG. 6 are shown. First, the search unit 500 selects a first avatar that has performed activities (step S700). The selected first avatar is defined as an avatar A. Then, the search unit 500 selects a second avatar that has been influenced by the activities (step S710). The selected second avatar is defined as an avatar B. A score to be calculated is defined as $l_{A,B}$. The $l_{A,B}$ is previously initialized to 0.

Subsequently, the search unit 500 searches the activity history DB 12 for one of activities in which the avatar A has changed the states of the avatar B during a time period between (T-$t_s$) and T, where T is the current time (step S720). The retrieved activity is defined as int (A,B). Then, the calculation unit 510 determines the weight of the retrieved activity on the basis of the activity type thereof (step S730). The determined weight is defined as $W_{int(A,B)}$.

Subsequently, the calculation unit 510 adds the weight $W_{int(A,B)}$ to the halfway calculated score $l_{A,B}$ (step S740). If any activity in which the avatar A has changed the states of the avatar B has not been retrieved ("NO" in step S750), the process returns to step S720 and the search unit 500 searches for such an activity.

If all the activities in which the avatar A has changed the states of the avatar B have been retrieved ("YES" in step S750), the calculation unit 510 determines whether searches have been made with respect to all combinations of the avatars (step S760). If searches have not been made with respect to any combination (NO in step S760), the process returns to the step S700 and the search unit 500 continues to make searches with respect to such a combination.

If searches have been made with respect to all the combinations of the avatars (YES in step S760), the process in the step S600 is complete.

Figures 8, 9:
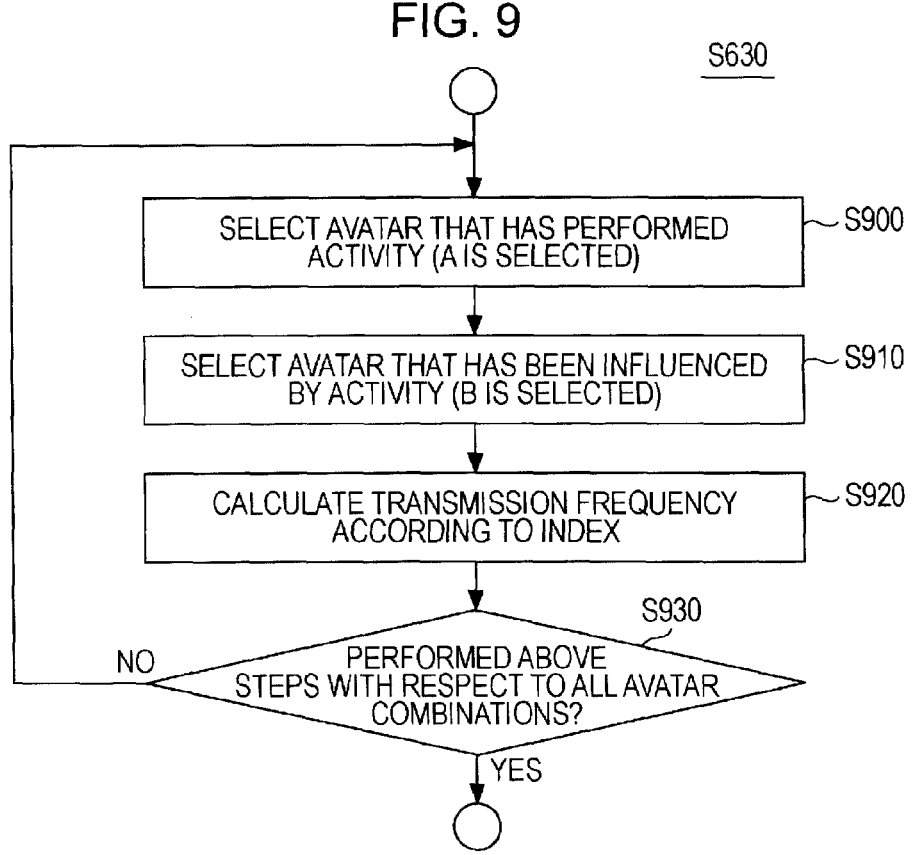
FIG. 8 shows a specific example of scores calculated by a calculation unit.
FIG. 9 shows details of the process step S630 of FIG. 6.

Referring to FIG. 8, there is shown a specific example of the scores calculated by the calculation unit 510 according to this embodiment with respect to each combination of the avatars. Arranged in the lateral direction of this table are the identifiers (A, B, C, D, E and F) of avatars, which have changed the states of other avatars. Arranged in the vertical direction of this diagram are the identifiers (A, B, C, D, E and F) of avatars, whose states have been changed by other avatars.

The numerical values in the table are scores indicating the extent to which the states of each avatar have been changed. For example, the extent to which the avatar B has changed the states of the avatar A is represented by a numerical value 10. On the other hand, the extent to which the avatar B has changed the states of the avatar A is represented by a numerical value 8. These numerical values can be understood as the degrees of attention or the magnitudes of influence in the virtual world.

For example, if the avatar B has changed the states of the avatar A, it is understood that the avatar A has been significantly influenced by the activities performed by the avatar B. If the avatar B has sent a number of messages to the avatar A, it is considered that there is a high possibility that the avatar A wants to know about the avatar B. who is the sender of the messages. In this case, it is understood that the avatar A is paying a high degree of attention to the avatar B.

Referring again to FIG. 6, calculation unit 510 calculates the sum of the scores calculated with respect to each of the avatars (step S610). Also, in preparation for a later calculation, the calculation unit 510 calculates the ratio of the sum of the above-described scores calculated with respect to each avatar for a second period between (T-$t_s$) and T to the sum of scores previously calculated with respect to each avatar for a first period between the (T-2$t_s$) and (T-$t_s$).

The measurement unit 520 measures the amount of communications between the multiple clients 200 and server 100 during the period between (T-$t_s$) and T on the basis of the state of the communication interface 102 or the like (step S620). The amount of communications may be, for example, the average of proportions of the occupied communication band. Or the amount of communications may be the number of packets used by the communication interface 102 during communications.

Also, in preparation for the later calculation, the measurement unit 520 calculates the ratio of the above-described amount of communications measured with respect to the second period between (T-$t_s$) and T to the predetermined target amount of communications. On the basis of the values calculated or measured in these ways, the transmission control unit 530 calculates the frequency with which the states of each avatar are transmitted from the server 100 to each client 200 (step S630). One example of this step is shown in FIG. 9.

Referring to FIG. 9, details are shown of the process in step S630 of FIG. 6. The search unit 500 selects the first avatar that has performed activities (step S900). The selected first avatar is defined as an avatar A. Then, the search unit 500 selects the second avatar that has been influenced by activities performed by the avatar A (step S910). The selected second avatar is defined as an avatar B. The score previously calculated with respect to the combination of the avatars A and B is defined as $l_{A,B}$.

Subsequently, the transmission control unit 530 calculates the frequency of transmission of the states on the basis of the score $l_{A,B}$ (step S920). This transmission frequency refers to the frequency with which the states of the avatar A are transmitted from the server 100 to the client 200 for operating the avatar B. A specific example of calculation of this frequency will be described below.

Here, an example of calculation of a transmission cycle, which is the reciprocal of the transmission frequency, is shown. First, the transmission control unit 530 previously calculates a reference value that will serve as a reference for calculating a transmission cycle. If a period between (T-$t_s$) and T is defined as a second period, this reference value is calculated on the basis of a reference value corresponding to a first period between (T-2$t_s$) and (T-$t_s$), which is a period immediately before the second period.

Here, the reference value corresponding to the second period is defined as $K_2$ and the reference value corresponding to the first period is defined as $K_1$. The ratio of the sum of the scores with respect to the second period to the sum of the scores with respect to the first period is defined as $P_1/P_2$ (which is previously obtained in step S610). Also, the ratio of the above-described amount of communications calculated with respect to the second period between (T-$t_s$) and T to the predetermined target amount of communications is defined as $Q_2/Q_s$ (which is previously obtained in step S620).

The transmission control unit 530 calculates the product of the ratio $P_1/P_2$ and ratio $Q_2/Q_s$. Then, the transmission control unit 530 multiplies the reference value $K_1$ corresponding to the first period by the calculated product so as to calculate the reference value $K_2$ corresponding to the second period. This calculation is represented by the following formula:

$$K2 = K_1 \times P_1/P_2 \times Q_2/Q_s$$

The reference value $K_2$ is increased as the sum of the extents to which an avatar has changed the states of another avatar is increased. The reference value $K_2$ is also increased as the amount of communications is increased.

Subsequently, the transmission control unit 530 divides this reference value by the score $l_{A,B}$, which is previously calculated with respect to the combination of the avatars A and B. Then, the transmission control unit 530 sets the value obtained by performing this division for the frequency with which the states of the avatar A are transmitted from the server 100 to the client 200 for operating the avatar B.

Here, the ratio between the score sums, $P_1/P_2$, is used to calculate the reference value. This is intended to adjust the frequency with which the states of each avatar are transmitted, according to changes in the sum (it is assumed that this sum is in proportion to the total amount of communications) of the scores. Also, the ratio between the total amounts of communications, $Q_2/Q_s$, is used to calculate the reference value. This is intended to make the communication amount close to the target communication amount. Thus, the frequency with which the states of each avatar are transmitted is increased as much as possible while maintaining the total amount of communications at a given level.

The control system 130 repeats the above-described steps with respect to all combinations of the avatars (step S930). Since the reference value is a constant value regardless of which avatars are combined, it is sufficient to calculate the reference value only once.

Referring to FIG. 10, an example is shown of the downlink synchronization cycle calculated by the transmission control unit 530 according to this embodiment. The states of the avatar B are transmitted from the server 100 to the client 200 for operating the avatar A in cycles of, e.g., 0.18 sec. The states of the avatar A are transmitted from the server 100 to the client 200 for operating the avatar B in cycles of, e.g., 0.225 sec. Each blank field indicates that there is no relevant history. In comparison with FIG. 8, it is understood that the state update cycle is shortened as the score indicating the extent to which the states have been changed becomes larger.

Referring again to FIG. 6, if the calculated frequency, with which the states are to be transmitted, is out of a predetermined frequency range, the transmission control unit 530 modifies this frequency so that the frequency falls within the range (step S635).

Referring to FIG. 11, an example is shown of the downlink synchronization period modified by the transmission control unit 530 according to this embodiment. The states of the avatar B are transmitted from the server 100 to the client 200 for operating the avatar A in modified cycles of, e.g., 0.20 sec. The states of the avatar A are transmitted from the server 100 to the client 200 for operating an avatar F in modified cycles of, e.g., 10 sec.

In this case, the range of the cycle is from 0.2 sec. to 10 sec. This is because, even if the cycle range is set to a value smaller than 0.2 sec., the states may not be transmitted due to the limitation of performance of the server 100, communication network 15, and clients 200 or because it is meaningless to set the cycle range to a value smaller than 0.2 sec. since such a short cycle exceeds the limit of the perception ability of a user who attempts to experience the virtual world. This is because, even if the cycle range is set to a value larger than 10 sec., it is not so meaningful in terms of a reduction in communication traffic or because it is not appropriate to set the cycle range to such a large value since the update of the virtual world is delayed too much.

Referring again to FIG. 6, the transmission control unit 530 controls the data transmission frequency by operating the communication interface 102 according to the calculated cycle (frequency) (step S645). Thereafter, with respect to each avatar, the reception control unit 540 sets the frequency with which the server 100 receives the states of the avatar from the client 200 for operating the avatar (step S650). This step will be described with reference to FIGS. 11 and 12.

First, the reception control unit 540 selects, with respect to each avatar, the largest frequency (shortest cycle) from among the frequencies with which the server 100 transmits the states of the avatar to the clients 200 for operating other avatars. For example, the reception control unit 540 selects the shortest cycle, 0.225, from among the cycles listed on a column A shown in FIG. 10.

Then, the reception control unit 540 sets the selected highest frequency (shortest period) for the frequency (cycle) with which the server 100 receives the states of the avatar from the client 200 for operating the avatar. As a result, as shown in FIG. 12, the cycle with respect to the avatar A is set to 0.225. This means that the server 100 receives the states of the avatar A from the client 200 for operating the avatar A in cycles of 0.225 sec.

By repeating the above-described process with respect to each avatar, the reception control unit 540 sets, with respect to each avatar, the frequency with which the server 100 receives the states of the avatar from the client 200 for operating the avatar.

Referring back to FIG. 6, if any of the set frequencies, with which the server 100 is to receive the states, is out of a predetermined frequency range, the reception control unit 540 modifies this frequency so that the frequency falls within the range (step S655).

FIG. 13 shows an example of the uplink synchronization cycle modified by the reception control unit 540 according to this embodiment. Cycles in which the server 100 receives the states of the avatar B are changed from 0.18 sec. to 0.2 sec. Cycles in which the server 100 receives the states of the avatar F are set to the largest value, 10 sec. The reason the range of the reception frequency is set is similar to that for the transmission frequency. For example, this is because too high a frequency is inappropriate in terms of performance of the server 100 or clients 200.

Reception control unit 540 controls the data reception frequency by operating the communication interface 102 according to the set cycle (frequency) (step S660 in FIG. 6).

Referring to FIG. 14, an example is shown of a hardware configuration of a server 100 according to this embodiment. The server includes a CPU peripheral unit, an input/output unit, and a legacy input/output unit. The CPU peripheral unit includes a CPU 1000, a RAM 1020, and a graphic controller 1075, which are coupled via a host controller 1082. The input/output unit includes a communication interface 1030, a hard disk drive 1040, and a compact disc-read-only memory (CD-ROM) drive 1060, which are coupled to the host controller 1082 via an input/output controller 1084. The legacy input/output unit includes a ROM 1010, a flexible disk drive 1050, and an input/output chip 1070, which are coupled to the input/output controller 1084.

The host controller 1082 couples the RAM 1020 and the CPU 1000 and is configured to access the graphic controller 1075 and the RAM 1020 at a high transfer rate. The CPU 1000 operates according to programs stored in the ROM 1010 and RAM 1020 so as to control each component. The graphic controller 1075 acquires image data generated by the CPU 1000 or the like on a frame buffer provided in the RAM 1020 and displays the acquired image data on a display unit 1080. Alternatively, the graphic controller 1075 may include a frame buffer for storing image data generated by the CPU 1000 or the like.

The input/output controller 1084 couples the host controller 1082, and the communication interface 1030 (which is a relatively high-speed input/output device), the hard disk drive 1040, and the CD-ROM drive 1060. The communication interface 1030 is one example of the communication interface 102 and communicates with an external device via a network. The hard disk drive 1040 is one example of the storage unit 104 and stores a program and data to be used by the computer. The CD-ROM drive 1060 reads a program or data from the CD-ROM 1095 and provides the read program or data to the RAM 1020 or hard disk drive 1040.

Also coupled to the input/output controller 1084 are the ROM 1010 and relatively low-speed input/output devices, such as the flexible disk drive 1050 and the input/output chip 1070. The ROM 1010 stores a boot program to be executed by the CPU 1000 when the computer is booted up, a program dependent on the hardware of the computer, and the like. The flexible disk drive 1050 reads a program or data from the flexible disk 1090 and provides the read program or data to the RAM 1020 or hard disk drive 1040 via the input/output chip 1070. Coupled to the input/output chip 1070, for example, via a parallel port, a serial port, a keyboard port, a mouse port, or the like are the flexible drive 1050 and various types of input/output devices.

A program to be provided to the computer by the user is stored in a recoding medium, such as the flexible disk 1090, the CD-ROM 1095, or an integrated circuit (IC) card. The program is read from such a recording medium via the input/output chip 1070 and/or input/output controller 1084 and installed to the computer so as to be executed. Operations that the program causes the computer or the like to execute are the same as the operations of the server 100 described with reference to FIGS. 1 to 13 and will not be described.

The above-described program may be stored in an external storage medium. Besides the flexible disk 1090 and CD-ROM 1095, storage media include optical recording media such as a digital versatile disc (DVD) and a phase change rewritable disk (PD), magneto-optical recording media such as a Mini-Disc (MD), tape media, and semiconductor memories such as an IC card. Further, a storage device, such as a hard disk or a RAM, provided in a server system connected to a dedicated communication network or the Internet may be used as a recording medium so that the program is provided to the computer via such a network.

As described above, according to this embodiment, the frequencies with which the clients and server communicate with one another to create a virtual world are controlled on the basis of the extents to which each avatar has changed the states of other avatars in the virtual world. Thus, information the user wants is properly selected and updated with a high frequency; information that is not so important is updated with a lower frequency. As a result, the resource of the communication network is effectively used.

Thus, for example, the appearance, position, orientation, and the like of an avatar that has just made an assault in a game of a virtual world are more frequently updated on the screen. Also, the appearance, position, orientation, and the like of other avatars included in an image indicating the sight of the avatar in the virtual world are frequently updated on the screen. On the other hand, the appearance, position, orientation, and the like of other avatars not included in an image indicating the sight of the avatar in the virtual world are not updated frequently on the screen. Also, the states of avatars not related to the assault or sight are hardly communicated between the server 100 and clients 200.

The above-described control provides, for example, the following advantages. A virtual world with a high real-time nature is created efficiently using an existing communication network or server. Thus, additional capital spending may be reduced while creating a virtual world of high quality. Also, a virtual world including more avatars is created while using the existing communication network or server. Thus, additional capital spending may be reduced while creating a more large-scale virtual world.

While the present invention has been described with reference to a preferred embodiment thereof, the technical scope of the invention is not limited thereto. It is apparent for those skilled in the art that various changes and modifications can be made to the embodiment. For example, at least part of the functions of the server 100 may be provided in each of the clients 200-1 to 200-N. It is apparent from the description and the appended claims that an embodiment to which such a change or modification is within the scope of the invention as set forth in the following claims.

What is claimed is:

1. A server comprising:
    a storage unit for storing a history of activities performed by two or more characters in a virtual world according to operations performed on a plurality of clients;
    a search unit for searching the storage unit to retrieve a history of activities in which a first character has changed a state of a second character or a third character, the first character having performed an activity according to an operation performed by a first client, the second character having performed an activity according to an operation performed on a second client and the third character having performed an activity according to an operation performed on a third client;
    a calculation unit for calculating, on the basis of the retrieved history, a first numerical score indicating the extent to which the first character has changed the state of the second character and a second numerical score indicating the extent to which the first character has changed the state of the third character; and
    a transmission control unit for controlling, on the basis of the calculated numerical scores, a frequency with which a state of the first character is transmitted to the second client and to the third client, the state of the first character having been changed according to an operation performed by a user on the first client.

2. The server according to claim 1, further comprising:
    a synchronization unit for acquiring, from each of the clients, a state of a character that has been updated and for transmitting the acquired state to each of the clients, the character being operated by a corresponding client, wherein:
    the server is coupled to each of the clients, and
    the transmission control unit controls the frequency with which the state of the first character is transmitted from the server to the second client, on the basis of the calculated numerical score.

3. The server according to claim 2, wherein the transmission control unit increases the frequency of transmission from the server to the second client in proportion to the magnitude of the calculated numerical score.

4. The server according to claim 1, wherein weights indicating likelihoods that types of activity performed by a character change a state of the character are previously associated with the activity types, and the calculation unit calculates the numerical score by summing up the weights corresponding to types of activities included in the retrieved history.

5. The server according to claim 2, further comprising:
    a measurement unit for measuring an amount of communication between the multiple clients and the server during a past predetermined period, wherein if the measured communication amount is larger than a predetermined target communication amount, the transmission control unit reduces a transmission frequency.

6. The server according to claim 3, wherein the transmission control unit sets a numerical value obtained by dividing a previously calculated reference value by the calculated numerical score, and uses the value to control a frequency with which the state of the first character is transmitted from the server to the second client.

7. The server according to claim 6, wherein:
    the search unit searches, with respect to each character in the virtual world, for a history of activities in which a state of the character has been changed by any other character during each predetermined period;
    the calculation unit calculates, with respect to each character in the virtual world and on the basis of a history retrieved with respect to the character, a score indicating the extent to which a state of the character has been changed by any other character during each predetermined period;
    the transmission control unit calculates a product of (i) a ratio of a sum of the scores with respect to each character for a second period to a sum of the scores with respect to each character for a first period and (ii) a ratio of the communication amount measured with respect to the second period to the predetermined target communication amount; and
    the transmission control unit calculates a reference value with respect to the second period by multiplying a reference value with respect to the first period by the calculated product.

8. The server according to claim 2, wherein the transmission control unit changes the frequency to a value within the range if the frequency with which a state is to be transmitted is out of a predetermined frequency range.

9. The server according to claim 2, further comprising:
    a reception control unit for controlling, with respect to each character, a frequency with which the server acquires a state of the character, wherein the frequency is based upon the largest value of scores indicating the extent to which the state of the character has been changed by activities performed by each of other characters;

wherein the search unit searches for, with respect to each character in the virtual world, a history of activities in which a state of the character has been changed by any other character, and wherein the calculation unit calculates, with respect to each character in the virtual world, a score indicating the extent to which a state of the character has been changed by any other character, on the basis of a history retrieved with respect to the character.

10. The server according to claim 9, wherein the transmission control unit changes the frequency to a value within the range if the frequency with which a state is to be received is out of a predetermined frequency range.

11. The server according to claim 1, wherein the search unit searches for a history of display of an object representing the first character on a window indicating an appearance of the second character operated by the second client, as a history of activities in which the first character has changed a state of the second character.

12. The server according to claim 1, wherein the search unit searches for a history of arrival of messages transmitted from the first character to the second character, as a history of activities in which the first character has changed a state of the second character.

13. The server according to claim 1, wherein the search unit searches for a history of hearing by the second character of a sound emitted by the first character in the virtual world, as a history of activities in which the first character has changed a state of the second character.

14. The server according to claim 1, wherein:
the virtual world is a game world in which characters fight each other, and
the search unit searches for a history of the presence of the first character within a range of a gun possessed by the second character in the virtual world, as a history of activities in which the first character has changed a state of the second character.

15. A method comprising:
storing a history of activities in a storage unit according to control performed by a computer, which activities were performed by two or more characters in a virtual world according to operations performed on client computers;
searching, according to control performed by the computer, the stored activities to retrieve a history of activities in which a first character has changed a state of a second character or a third character, the first character having performed an activity according to an operation performed on a first client, the second character having performed an activity according to an operation performed on a second client and the third character having performed an activity according to an operation performed on a third client;
calculating, on the basis of the retrieved history, a first numerical score indicating the extent to which the first character has changed the state of the second character and a second numerical score indicating the extent to which the first character has changed the state of the third character; and
controlling a frequency with which a state of the first character is transmitted to the second client and to the third client, on the basis of the calculated numerical scores, the state of the first character having been changed according to an operation performed by a user on the first client.

16. An article of manufacture comprising a non-transitory storage medium on which is stored a program for causing a computer which includes a storage unit storing a history of activities, the activities having been performed by two or more characters in a virtual world according to operations performed on clients, to serve as:
a search unit for searching the storage unit for, and retrieving therefrom, a history of activities in which a first character has changed a state of a second character or a third character, the first character having performed an activity according to an operation performed on a first client, the second character having performed an activity according to an operation performed on a second client and the third character having performed an activity according to an operation performed on a third client;
a calculation unit for calculating, based on the retrieved history, a first numerical score indicating the extent to which the first character has changed the state of the second character and a second numerical score indicating the extent to which the first character has changed the state of the third character; and
a transmission control unit for controlling, based on the calculated numerical scores, a frequency with which a state of the first character is transmitted to the second client and to the third client, the state of the first character having been changed according to an operation performed by a user on the first client;
wherein the storage unit is connected to the search unit, the search unit is connected to the calculation unit, and the calculation unit is connected to the transmission control unit.

17. An article of manufacture tangibly embodying a non-transitory computer readable program which when implemented causes the computer to perform the steps of a method comprising:
storing a history of activities in a storage unit according to control performed by a computer, which activities were performed by two or more characters in a virtual world according to operations performed on client computers;
searching, according to control performed by the computer, the stored activities to retrieve a history of activities in which a first character has changed a state of a second character or a third character, the first character having performed an activity according to an operation performed on a first client, the second character having performed an activity according to an operation performed on a second client and the third character having performed an activity according to an operation performed on a third client;
calculating, on the basis of the retrieved history, a first numerical score indicating the extent to which the first character has changed the state of the second character and a second numerical score indicating the extent to which the first character has changed the state of the third character; and
controlling a frequency with which a state of the first character is transmitted to the second client and to the third client, on the basis of the calculated numerical scores, the state of the first character having been changed according to an operation performed by a user on the first client.

* * * * *